Patented May 4, 1954

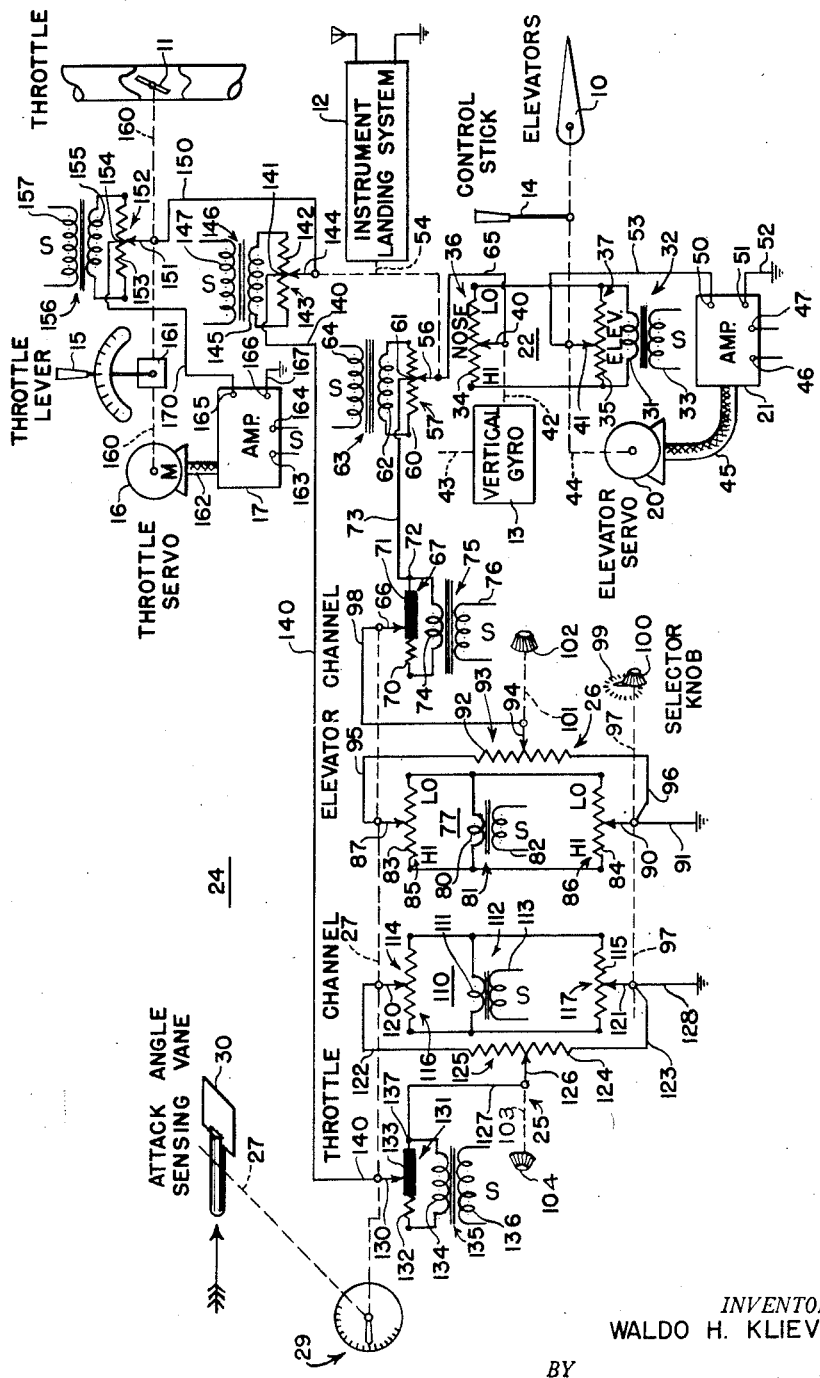

2,677,513

UNITED STATES PATENT OFFICE 2,677,513

APPARATUS FOR AIRCRAFT CONTROL IN ACCORDANCE WITH ATTACK ANGLE

Waldo H. Kliever, Minneapolis, Minn., assignor to Minneapolis-Honeywell Regulator Company, Minneapolis, Minn., a corporation of Delaware Application December 30, 1948, Serial No. 68,237

24 Claims. (Cl. 244—77)

This invention relates to the field of aircraft control apparatus, and more particularly to such apparatus as is designed to bring about and maintain a selected condition of flight of the craft.

Various characteristics of craft operation have been made use of from time to time as measures of preferred operation of the craft. Characteristics so used in the past include attitude, air speed, altitude, power output, etc., and one or more of the controlling members of the craft, such as elevators, ailerons, throttles, etc., have been controlled in the various systems.

The present invention has for a broad object to provide improved apparatus for controlling the performance of a craft in accordance with angle of attack.

It is also an object of the invention to provide an apparatus of the above type with automatic overriding means becoming effective as the angle of attack exceeds a selected value.

It is another object of the invention to provide such apparatus in which the performance of a craft is controlled in accordance with attack angle by simultaneously altering the throttle and elevator settings.

It is another object of the invention to provide apparatus in which flight of the craft can be maintained at an adjustable angle of attack, by means of control exerted by an attack angle sensing unit over the elevators and throttles of the craft.

It is another object of the invention to provide apparatus of the type described in which the ratio between the control exerted by the attack angle sensing unit over the elevators of the craft and the control exerted over the throttles of the craft may be varied.

A further object of the invention is to provide flight control apparatus for maintaining a constant angle of attack in an attitude-stabilized craft, by simultaneously controlling the elevators and throttle of the craft.

It is a further object of the invention to provide flight control apparatus effective when the angle of attack exceeds a selected value to cause corrective operation of both the elevators and the throttle.

It is a further object of the invention to provide flight control apparatus for causing a craft to follow a radio glide path at a constant angle of attack.

A still further object of the invention is to provide apparatus of the type just described in which an attack angle sensing device performs the desired function by simultaneously controlling the throttles and elevators of the craft.

Yet another object of the invention is to provide apparatus of the type just described in which the attitude of the craft is stabilized at all times independently of the attack angle control.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

The single figure of the drawing schematically illustrates aircraft control apparatus according to the invention.

It is well known to those skilled in aerodynamics that the movement of a craft in flight, in a vertical plane through the longitudinal axis of the craft, is controlled in an interrelated fashion by the elevators and throttles of the craft, which govern its attitude, its air speed, and its rate of climb or glide. Control systems are known for regulating each of these characteristics, to give flight at a constant altitude, a constant air speed, or a constant attitude. It is also known to construct systems in which more than one of these characteristics is controlled, such for example as air speed and altitude. Heretofore, however, such systems have also included sensing means responding to the several characteristics to be controlled.

The attack angle of a craft, while a single characteristic, is related to air speed, attitude, and change in altitude. Moreover, attack angle is very closely related to tendency of a craft to stall, which can take place at any air speed or at any attitude. Control of a craft in accordance with attack angle is thus very advantageous both because of the fundamental nature of the variable being sensed in its relation to other more restricted variables, and because of the direct relation between the attack angle and stall.

The latter feature cannot be overemphasized. Stall is not simply a nose-high, low-speed, low-power phenomenon. It is possible to stall at full throttle, or at high speed, or in a diving attitude: stalling in power dives was found to be a source of considerable danger until this principle was accepted. Moreover, in modern craft designed for high wing loading it is very difficult for the human pilot to make an accurate estimate of his angle of attack. Because of this uncertainty, the pilot must operate the craft so as to be sure of a small enough angle of attack for safety: as a result landing speeds are higher than necessary requiring longer runways. A second result of the uncertainty as to the exact attack angle is reduced operating range, since only for a particular attack angle is the craft most efficient.

The importance of attack angle has not been overlooked entirely: numerous proposals have been made particularly for indicators to warn the pilot if his attack angle is becoming so large that a stall is imminent. The use of attack angle as a variable in response to which a craft is to be controlled, by means of the elevators and throttles of the craft, has not heretofore been suggested; however, a system of control along these lines is described herein.

As shown in the figure, the system is to be installed in an aircraft having pitch control surface means 10, comprising the elevators of the craft, and power control means 11, comprising the throttles of the craft. For the sake of simplicity in illustration the craft is illustrated as having only a single engine. The system is also shown as comprising the air-borne components 12 of an instrument landing system, for causing the craft to follow a selected glide path, and a vertical gyroscope 13 for establishing a standard of attitude with respect to the earth. The elevators are normally actuated by a control stick 14, and a throttle lever 15 is arranged for actuating the throttle 11, the throttle position comprising a factor affecting engine operation. In the practice of the invention the throttle setting is adjusted by a throttle servomotor 16 energized from a throttle amplifier 17, and the elevators are controlled by an elevator servomotor 20 energized from an elevator amplifier 21 whose input includes an elevator bridge 22, which may comprise portions of a more elaborate automatic pilot.

The system further includes an attack angle control unit 24 having a throttle channel 25 and elevator channel 26, both influenced by a mechanical input 27 from an attack angle sensing unit 30, which also drives an indicator 29 either directly or through a suitable telemetric system. The various general components enumerated above will now be considered in further detail.

The system is energized with alternating voltage from a plurality of transformer secondary windings. In the drawing these windings are shown as provided with individual cores and primary windings, but it will of course be realized that it is equally satisfactory to provide a single primary winding for all the secondary windings. The elevator bridge 22 is energized from the secondary winding 31 of a transformer 32 having a primary winding 33. Bridge 22 comprises the parallel connection of the windings 34 and 35 of a pair of voltage dividers 36 and 37 having sliders 40 and 41 all respectively.

Sliders 40 and 41 comprise the output terminals of the bridge; slider 40 is moved with respect to winding 34 by mechanical connection 42 to vertical gyroscope 13, so that its position with respect to winding 34 changes as the craft changes its pitch attitude. Gyroscope 13 is provided with a second output 43 for use in connection with the roll axis of the craft.

Slider 41 of bridge 22 is actuated by a mechanical connection 44 to elevator servomotor 20. This servomotor is energized through a suitable multi-conductor cable 45 from amplifier 21, which has power terminals 46 and 47 energized from the source of alternating voltage, and input terminals 50 and 51, the latter being grounded as at 52. Terminal 50 is connected to slider 41 of bridge 22.

Mechanical connection 44 is continued so that motor 20 may actuate elevators 10, control stick 14 moving in accordance with the operation of motor 20 and the elevators. A suitable disconnect may be provided between control stick 14 and servomotor 20 if desired, so that emergency operation of the elevator may be carried on by the control stick regardless of the servomotor.

Servomotor 20 is preferably provided with a clutch which is energized electrically, to interconnect shaft 44 with the motor, when the latter is energized from amplifier 21. The motor-amplifier combination is of the well known type in which the motor is energized for forward or reverse operation according to the phase of a reversible signal supplied to the amplifier and in which the motor does not move in either direction when the amplifier has no signal voltage. This also applies to motor 16 and amplifier 17.

Instrument landing system 12 may be of any suitable type which provides a mechanical output 54 whose sense and magnitude depend upon the amount and direction of displacement of the craft from a desired landing path. Such instruments are known in the art, one suitable form thereof being disclosed in copending application 49,442 of Alderson and Carpenter filed September 15, 1948 and assigned to the assignee of the present application. By means of mechanical connection 54, the instrument landing system 12 actuates the slider 56 of a voltage divider 57 having a winding 60 which is center tapped at 61. Winding 60 is energized from the secondary winding 62 of a transformer 63 having a primary winding 64 energized from the source of alternating voltage. Slider 56 is connected by conductor 65 to slider 40 of bridge 22.

Vane 30 acts through mechanical connection 27 to actuate the slider 66 of a voltage divider 67 with respect to its winding 70. This winding is metallized as at 71 over the major portion of its length, so that for any position of vane 30 within this wide range the metallized portion 71 acts as a short circuit between slider 66 and terminal 72 of the winding. Terminal 72 is connected by conductor 73 to center tap 61 of voltage divider 57. Winding 70 of voltage divider 67 is energized from the secondary winding 74 of a transformer 75 having a primary winding 76 energized from the source of alternating voltage. The purpose of this structure will be more fully explained below.

Transformer 75 and voltage divider 67 comprise the stall prevention portion of elevator channel 26, which also includes a control surface bridge 77 energized from the secondary winding 80 of a transformer 81 having a primary winding 82 energized from the source of alternating voltage. The bridge comprises the windings 83 and 84 of a pair of voltage dividers 85 and 86 having sliders 87 and 90 respectively. Slider 90 is grounded at 91. The winding 92 of a voltage divider 93 having a slider 94 is connected between sliders 87 and 90 of bridge 77 by means of conductors 95 and 96.

Sliders 87 and 90 are the output terminals of bridge 77, and of the voltage appearing between the output terminals a portion determined by the position of slider 94 appears between the slider and ground. Slider 94 is connected to slider 66 of voltage divider 67 by conductor 98. Slider 87 is actuated by mechanical connection 27 from attack angle sensing vane 30. Slider 90 is actuated by a mechanical connection 97 to a manually operated selector knob 100 whose pointer moves with respect to a scale 99. Slider 94 is actuated by a mechanical connection 101 to a manually operated knob 102.

The input circuit to amplifier 21 may now be traced from terminal 51 through ground connections 52 and 91, conductor 96, the portion of winding 92 below slider 94, the slider, conductor 98, slider 66, the portion of winding 70 to the right of slider 66, terminal 72, conductor 73, center tap 61, the portion of winding 60 between center tap 61 and slider 56, the slider, conductor 65, slider 40, bridge 22, slider 41, and conductor 53 to input terminal 50 of the amplifier. This input circuit accordingly comprises the series addition of four voltages, a portion of the output from bridge 77 as determined by the position of slider 94, the output of the elevator stall prevention circuit, the output of voltage divider 57, and the output of bridge 22. When these voltages add up to zero, amplifier 21 is deenergized and elevator servomotor 20 does not operate. When the voltages do not add up to zero, amplifier 21 is energized with alternating voltage of a first phase or of the opposite phase, and servomotor 20 is energized for operation in one sense or the other, adjusting the position of elevator 19 and also moving slider 41 with respect to winding 35 to reduce the magnitude of the input to the amplifier.

Throttle channel 25 of attack angle control unit 24 is constructed in the same fashion as elevator channel 26. A throttle bridge 110 is energized from the secondary winding 111 of a transformer 112 having a primary winding 113 connected to the source of alternating voltage. The voltage supplied by secondary winding 111 is conveniently equal to that supplied by secondary winding 80. Bridge 110 comprises the windings 114 and 115 of a pair of voltage dividers 116 and 117 having sliders 120 and 121. Slider 121 is grounded at 128. The winding 124 of a voltage divider 125 having a slider 126 is connected between sliders 120 and 121 of bridge 110 by means of conductors 122 and 123. Sliders 120 and 121 are the output terminals of bridge 110, and of the voltage appearing between these output terminals a portion determined by the position of slider 126 appears between the slider and ground.

Slider 120 is actuated by mechanical connection 27 from sensing vane 30. Slider 126 is actuated by mechanical connection 103 to a manually operable knob 104. Slider 121 is actuated by mechanical connection 97 to selector knob 100, the connection being such that sliders 121 and 90 move in the same direction along their windings when knob 100 is turned.

Slider 126 is connected by a conductor 127 to one terminal 137 of a voltage divider 131 having a slider 130 and a winding 132, a major portion of which is metallized as at 133, as described in connection with winding 70. Winding 132 is energized from the secondary winding 134 of a transformer 135 having a primary winding 136 energized from the source of alternating voltage.

Slider 130 is connected by a conductor 140 to a center tap 141 on the winding 142 of a voltage divider 143 having a slider 144. Winding 142 is energized from the secondary winding 145 of a transformer 146 having a primary winding 147 energized from the source of alternating voltage.

Slider 144 is connected by a conductor 150 to the slider 151 of a voltage divider 152 having a winding 153 center tapped at 154. Winding 153 may be either linear, or characterized according to the relation between attack angle and throttle setting, and is energized from the secondary winding 155 of a transformer 156 having a primary winding 157 energized from the source of alternating voltage.

Slider 144 is actuated by mechanical connection 54 from instrument landing system 12. Slider 151 is actuated simultaneously with operation of throttle 11 from servomotor 16 by means of a mechanical connection 160 including a manual override 161 which provides means whereby throttle 11 can be actuated by manual lever 15 regardless of the operation of servomotor 16: when the throttle is adjusted by motor 16, the manual lever is also moved.

Motor 16 is energized through a multi-conductor cable 162 from amplifier 17, which has power terminals 163 and 164, energized from the source of alternating voltage, and input terminals 165 and 166, the latter being grounded at 167. Input terminal 165 is connected to center tap 154 by conductor 170.

The input circuit to amplifier 17 may be traced from input terminal 166 through ground connections 167 and 128, conductor 123, the portion of winding 124 below slider 126, the slider, conductor 127, terminal 137, the portion of winding 132 between the terminal and slider 130, the slider, conductor 140, center tap 141, the portion of winding 142 between the center tap and slider 144, the slider, conductor 150, slider 151, the portion of winding 153 between the slider and center tap 154, the center tap, and conductor 170 to input terminal 165. It is thus evident that the input to the amplifier comprises a series connection of four voltages, a portion of the output voltage of bridge 110 as determined by the position of slider 126, the output from the throttle stall prevention circuit, the output of voltage divider 143, and that from voltage divider 153. So long as the sum of these voltages is zero, the amplifier is unenergized, and operation of motor 16 does not take place. Whenever the sum of the voltages is not zero, the amplifier is energized accordingly, and motor 16 operates in one sense or the other, adjusting the position of throttle 11 and also moving slider 151 with respect to winding 153 to reduce the magnitude of the input to the amplifier.

In installing the system, mechanical connection 160 is adjusted so that movement of slider 151 from one end to the other of winding 153 accompanies movement of throttle 11 through a selected range which may be the full extent of its possible movement. Mechanical connection 54 is so adjusted that sliders 56 and 144 are at center taps 61 and 141 respectively when the craft is exactly on the desired instrument landing beam and so that departure of the craft from the desired beam in either direction to a selected extent results in movement of the sliders in either direction to the ends of their windings. It may also be preferred to put taps 61 and 141 at points other than the centers of their respective windings. The instrument landing system is normally deenergized with sliders 144 and 56 engaging center taps 141 and 61 respectively.

Mechanical connection 44 is adjusted so that slider 41 moves from one end of winding 35 to the other for a selected range of movement of elevators 19, and so that the slider is at the center of winding 35 when the elevators are streamlined. Winding 34 is carried by the craft, and slider 40 is stabilized by gyroscope 13. Mechanical connection 42 is so adjusted that when the craft is in a normal attitude about its pitch axis, the center of winding 34 comes into alignment with slider 40, and so that the range of relative movement of slider 40 and winding 34 corresponds to a desired range of attitude change.

Mechanical connection 27 is so adjusted that sliders 66, 87, 120, and 130, which move unitarily, are at the right hand ends of their windings when the attack angle as sensed by vane 30 is −12°, and at the left hand ends of their windings when the angle is +18°. The metallized portions of windings 70 and 130 extend from the right hand ends of the windings to the positions assumed by sliders 66 and 130 when the attack angle has some arbitrary value, as +12°: this angle is selected with special reference to the aerodynamic characteristics of each craft being equipped, and represents the maximum safe attack angle for that craft. The stalling angle is naturally slightly greater.

The initial adjustment of the system must now be made. For this purpose sliders 90 and 121 are temporarily disconnected from shaft 97, so that they may be independently adjusted along their respective windings, slider 151 is temporarily disconnected from shaft 160 and set to the position in which it engages center tap 151, and motors 16 and 20 are temporarily disconnected from shafts 44 and 160. Sliders 94 and 126 are set at the centers of their windings, and the electrical system is energized. The craft is brought into a condition of flight in smooth air at a constant altitude and a normal cruising speed by manual operation of throttle lever 15 and control stick 14: under these conditions the craft is in the normal attitude at the normal attack angle of say 4°, with the elevators streamlined. Vane 30 adjusts sliders 130, 120, 87 and 66 in accordance with the value of the normal attack angle: sliders 90 and 121 are then separately adjusted by hand until motors 16 and 20 are deenergized simultaneously. Knob 100 is next set at 4° on scale 99, sliders 90 and 121 are reconnected to shaft 97, slider 151 and motor 16 are reconnected to shaft 160, and motor 20 is reconnected to shaft 44. The apparatus is now in control of the craft, and operates to maintain its attack angle constant at the value for which the system was adjusted.

Knob 100 is now moved to a new reading on scale 99 displacing sliders 90 and 121: when operation of motors 16 and 20 again ceases the rate of climb of the craft is observed on an auxiliary rate of climb meter, and knobs 102 and 103 are operated until constant altitude flight is achieved at the new selected angle of attack. Change in altitude is corrected by moving slider 94 along winding 92 and any ensuing departure from the selected angle of attack is corrected by adjustment of the position of slider 126. Since power and attitude are interrelated, it may be necessary to repeat these adjustments until the desired condition is achieved. The system is now ready for use.

*Operation*

In explaining the operation of this system it will at first be assumed that the craft has manually been brought into the condition of normal cruising flight just described, the instrument landing system being deenergized with sliders 56 and 144 at their center taps, and sliders 94 and 126 being at the centers of their respective windings. Slider 151 is at some particular position on winding 153, by reason of manual adjustment of lever 15, slider 41 is at the center of winding 35 because the elevators are streamlined, and slider 40 is at the center of winding 34 because the craft is in the normal attitude. Vane 30 is in a position determined by the actual attack angle of the craft, which may for example be +4°, and sliders 66, 87, 120 and 130 are set in accordance with the position of vane 30 by connection 27.

When the system is electrically energized, there are impressed on the input to amplifier 21 the sum of the four voltages previously listed. One of these is the output of bridge 22, which is zero since sliders 40 and 41 are both at the centers of their windings—the craft being in the normal attitude and the elevators being streamlined.

Two others of the voltages which add to comprise the input to amplifier 24 are of zero magnitude, because slider 56 is at center tap 61, and slider 66 is on metallized section 71 of winding 70. The fourth voltage is the output of bridge 77, which must also be zero since the voltage on amplifier 21 is zero. Slider 87 is set at a position proportional to 4° by vane 30, and this determines the position of slider 90, which must be displaced from center of winding 84 in the same direction and to the same extent as slider 87.

Under the same conditions the sum of four voltages is also impressed on the input to amplifier 17. Of these, the voltage between terminal 137 and slider 130, the voltage between center tap 141 and slider 144, and the voltage between center tap 154 and slider 151 are of zero magnitude, and that from bridge 110, like that from bridge 77, is also zero.

So long as the flight of the craft continues at the attack angle of 4°, no input is supplied to amplifiers 17 and 21. Change in the attack angle of the craft due for example to change in the position of its center of gravity, decreases in load due to fuel consumption, vertical components of air movement, etc.—causes movement of vane 30 and hence of sliders 87 and 120. If the attack angle becomes 5°, for example, bridges 77 and 110 are no longer balanced, and amplifiers 17 and 21 are energized.

Motor 16 operates in a direction to increase the power supplied by throttle 11, and motor 20 operates in a direction to give down elevator. Simultaneously slider 151 is moved to a position in which the unbalance voltage from bridge 110 is neutralized by an equal voltage of opposite phase from voltage divider 152, and slider 41 is moved to a position in which the unbalance voltage from bridge 77 is neutralized by an equal unbalance voltage of opposite phase from bridge 22.

As a result of adjustment of the throttles and elevators the craft noses down and its air speed increases. These changes alter the value of the attack angle acting on vane 30, and sliders 120 and 87 are moved in a direction to decrease the unbalance voltages of bridges 110 and 77. The change in attitude of the craft also results in displacement of winding 34 with respect to slider 40, which reduces the unbalance of bridge 22. These effects combine to cause reverse energization of amplifiers 17 and 21, and reverse operation of motors 16 and 20 results, partially returning throttle 11 and elevators 10 to their original positions. If the condition which caused the angle of attack to change was a temporary one, the attitude and power of the craft continue to change causing continued movement of elevators 10 and throttle 11 back to their original positions when the attack angle again assumes the desired value. If, on the other hand, the condition which caused the attack angle to change is a permanent one, such as a permanent shift in the loading of the plane, a condition of equilibrium is reached in which the bridges 77 and 110 are slightly unbalanced to maintain the elevators 10 and the throttle 11 in new positions. While under these conditions the attack angle is not restored exactly to its original value, nevertheless, by a proper selection of the voltages applied to the bridges, the departure of the attack angle from the selected desired value can be made to be relatively small.

If it is desired to do so, change in the attack angle for the craft may be brought about simply by setting the index of knob 190 to the proper point on the scale. The desired attack angle may be that corresponding to greatest engine efficiency, or to maximum cruising range, or to minimum safe landing speed, according to the desires of the operator.

In the latter example the craft is coming into an area where turbulent air and vertical currents may be expected, and are especially dangerous. Changes in the configuration of the craft, such as lowering of wing flaps and landing gear, also take place at this time. For minimum landing speed, there must be maximum attack angle short of that resulting in stall conditions. In landings controlled by human pilots the actual maximum cannot be determined accurately and a margin for safety must be allowed.

According to the present invention, on the other hand, the attack angle is known at all times, so that the safe maximum value thereof may be set into the system and used to control the craft. If, due to the conditions of landing, the attack angle increases beyond this selected safe value, not only do bridges 110 and 77 energize amplifiers 17 and 21, to cause operation of motors 16 and 20 to decrease the attack angle, but voltages are independently supplied in the elevator and throttle channels from sliders 66 and 130, which are moved off the metallized portions of their windings when the safe angle is exceeded. These latter voltages persist until a safe value of attack angle is restored, regardless of the condition of bridges 77 and 110: a valuable safety feature is thus incorporated into the inventive system.

When the craft is preparing to land, instrument landing system 12 is energized and in the course of its operation sliders 66 and 144 are moved with respect to their windings. An inspection of the drawing makes it clear that the throttle channel of the control system is altered by the addition of the voltage appearing between slider 144 and center tap 141. Similarly, the elevator channel of the system is altered by the addition of the voltage between slider 56 and center tap 61. So long as the craft is on the proper glide path, sliders 56 and 144 remain at the center taps of their respective windings, but if the craft moves off the proper glide path, sliders 144 and 56 are moved to supply voltages in both channels of the system of such a nature as to cause operation of the elevators and throttles to return the craft to the desired glide path.

The sense of the voltages supplied by operation of member 54 is critical. If the craft is above the beam, the voltage supplied by divider 143 is of a phase to reduce the power by closing the throttle, and the voltage supplied by divider 57 is of a phase to give down elevator. By this relation it is possible to cause the craft to lose attitude while maintaining the desired attack angle.

It will be appreciated that if the selected attack angle is very close to the maximum safe value, the presence of a large signal in either channel due to operation of the instrument landing system could very easily bring the craft into a stalling condition by reason of increasing the attack angle beyond that called for by bridges 77 and 110. In this connection the stall prevention voltages from voltage dividers 131 and 67 are especially valuable.

In the foregoing disclosure I have described an aircraft control system in which the attack angle of the craft is used to control the throttles and elevators of the craft in a desired ratio, together with means continuously ready to cause corrective operation of these control members if the attack angle exceeds a safe value no matter what the selected attack angle may be. Obviously a constant attitude control could be substituted for the instrument landing system 50, if desired.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size and arrangement of parts, within the principle of the invention, to the full extent indicated by the broad general meaning of the terms in which the appended claims are expressed.

I claim as my invention:

1. In apparatus of the class described, in combination: a control surface; a motor drive for said control surface; an attack angle selecting device, an attack angle responsive device; a balanceable system including a portion adjusted by said selecting device and a portion adjusted by said responsive device; said system being in balance when the actual attack angle is that selected; and means effective upon unbalance of said system to energize said motor for adjusting said control surface.

2. In apparatus of the class described, in combination: a control surface; a motor drive for said control surface; a balanceable system including means responsive solely to actual attack angle and an attack angle selecting device; said system being in balance when the actual attack angle is that selected; means effective upon unbalance of said system to energize said motor for adjusting said control surface; and further means for causing operation of said motor in a direction resulting in decrease in the attack angle whenever it exceeds a predetermined value.

3. In apparatus of the class described, in combination: a throttle; a motor drive for said throttle; a control surface; a motor drive for said control surface; a balanceable system including means responsive solely to actual attack angle and an attack angle selecting device, said system being in balance when the actual attack angle is that selected; means effective upon unbalance of said system to energize said motors for adjusting said throttle and said control surface; and further means for causing energization of at least one of said motor means for operation to reduce said attack angle whenever said attack angle exceeds a predetermined value.

4. In apparatus of the class described, in combination: a throttle; a motor drive for said throttle; a control surface; a motor drive for said control surface; a balanceable system including means responsive solely to actual attack angle and an attack angle selecting device, said system being in balance when the actual attack angle is that selected; means effective upon unbalance of said system to energize said motors for adjusting said throttle and said control surface; and further means for causing energization of said motor means for operation to reduce said attack angle whenever said attack angle exceeds a predetermined value.

5. In apparatus of the class described, in combination: a control surface; a motor drive for said control surface; a vertical gyroscope; means responsive solely to actual attack angle; an attack angle selecting device; a balanceable system including means adjustable by said attack angle responsive means, said attack angle selective device, said vertical gyroscope, and said control surface, said system being in balance when the actual attack angle is that selected and when said craft is in a pitch attitude determined by said vertical gyroscope; and means effective upon unbalance of said system to energize said motor for adjusting said control surface.

6. In apparatus of the class described, in combination: a control surface; a motor drive for said control surface; a vertical gyroscope; means responsive solely to actual attack angle; an attack angle selecting device; a balanceable system including means adjustable by said attack angle responsive device, said attack angle selecting device, said vertical gyroscope, and said control surface, said system being in balance when the actual attack angle is that selected and when said craft is in a pitch attitude determined by said vertical gyroscope; means effective upon unbalance of said system to energize said motor for adjusting said control surface; and further means for causing energization of said motor to decrease said attack angle whenever said angle exceeds a predetermined value.

7. In apparatus of the class described, in combination: a throttle; a motor drive for said throttle; a control surface; a motor drive for said control surface; an instrument landing system responsive to departure of an aircraft from a predetermined glide path; means responsive solely to actual attack angle; an attack angle selecting device; a balanceable system including means actuated by said responsive device, said selecting device, and said instrument landing system, said balanceable system being in balance when the attack angle is that selected, and when the craft is located on an instrument landing path; and means effective upon unbalance of said system to energize said motors for adjusting said throttle and said control surface.

8. In apparatus of the class described, in combination: a control surface; a motor drive for said control surface; means responsive solely to actual attack angle; an attack angle selecting device; a vertical gyroscope; an instrument landing system responsive to departure of an aircraft from a predetermined glide path; a balanceable system including means actuated from said responsive device, said selecting device, said gyroscope, and said instrument landing system, said balanceable system being in balance when the attack angle is that selected, and when the craft is located on an instrument landing path; and means effective upon unbalance of said system to energize said motor for adjusting said elevators to return said system to a balanced condition.

9. In apparatus of the class described, in combination: a throttle; a motor drive for said throttle; a control surface; a motor drive for said control surface; means responsive solely to actual attack angle; an attack angle selecting device; a vertical gyroscope; an instrument landing system responsive to departure of an aircraft from a predetermined glide path; a balanceable system including means actuated from said attack angle responsive device, said selecting device, said gyroscope, and said instrument landing system, said balanceable system being in balance when the actual attack angle is that selected and when said craft is following a desired glide path; and means effective upon unbalance of said system to energize said motors for adjusting said throttles and said elevators until the actual attack angle becomes equal to that selected.

10. In apparatus of the class described, in combination: a powered aircraft; power control means and aerodynamic control means adjustable to cause movement of said craft at a selected attitude and airspeed within a range which may result in attack angles for the craft in excess of a predetermined magnitude; means responsive solely to actual attack angle; and means actuated by said responsive means only when the attack angle exceeds a predetermined magnitude to adjust both said control means so as to reduce said attack angle to said predetermined magnitude.

11. In apparatus of the class described, in combination: an aircraft having a power control member and a pitch attitude control surface; an attack angle sensing device; a vertical gyroscope; means normally connecting said gyroscope in controlling relation to said control surface; and means connecting said sensing device in controlling relation to said power control member and in overriding controlling relation to said control surface, so as to maintain a stabilized attitude and selected angle of attack.

12. Apparatus as in claim 11, including means effective whenever said attack angle exceeds a predetermined value, to cause corrective operation of said power control member and said pitch control surface.

13. Attack angle control apparatus comprising, in combination: means responsive solely to actual attack angle; an attack angle selecting device; means giving first outputs whenever the actual attack angle is not that selected; means giving outputs which vary with throttle position and elevator position; means combining one of said first outputs and said elevator position output to comprise a first control signal; an elevator servomotor; means controlling the operation of said elevator servomotor in accordance with said first control signal; means combining the other of said first outputs and said throttle position output to comprise a second control signal; a throttle servomotor; and means controlling operation of said throttle servomotor in accordance with said second control signal.

14. Attack angle control apparatus comprising, in combination: means responsive solely to actual attack angle; an attack angle selecting device; means giving a first output whenever the actual attack angle is not that selected; a control surface position responsive device; a pitch attitude selecting device; means giving a second output whenever said two last named devices are not in agreement; means combining said outputs to comprise a control signal; control surface servomotor means; and means controlling the operation of said servomotor means in accordance with said control signal.

15. In apparatus of the class described, in combination: means responsive solely to actual attack angle throughout a range of values extending on both sides of a predetermined value; stall prevention means actuated by said attack angle responsive means; and elevator control means actuated by said attack angle responsive means and by said stall prevention means.

16. In a device of the class described, in combination: control surface servomotor means; means giving a first output varying with deviation of actual attack angle from a selected value; means giving a second output whenever actual attack angle exceeds a selected value; means for giving a third output varying in accordance with deviation of a craft from a selected glide path; means combining said outputs to comprise a signal; and means actuating said servomotor means in accordance with said signal.

17. In an apparatus of the class described, in combination: an aircraft having a power control member and a pitch attitude control member; a device responsive solely to the attack angle of said aircraft throughout a range of values extending on both sides of a boundary value; and means actuated by said device, in response to values of said condition in excess of said boundary value, for actuating said members, in accordance with the amount of said excess, in a direction to reduce said attack angle.

18. In an aircraft approach and landing system for maintaining an airplane on a glide path defined by electromagnetic radiation, receiver means responsive to said glide path, selector means responsive to said receiver means for establishing a requested angle of attack, detector means responsive to changes in the angle of attack of the airplane, means for maintaining said airplane at a substantially constant instantaneous attitude, regulating means for varying the power output from the power unit of the airplane, means responsive to action of said selector means and said detector means for controlling said regulating means whereby the angle of attack of said airplane is caused to vary to correspond with said requested angle of attack, and alarm means responsive to a predetermined critical position of said detector means for automatically increasing the power output from said power unit and for automatically changing said attitude when said airplane reaches a critical angle of attack.

19. In an aircraft approach and landing system for maintaining an airplane on a flight track along a glide path beam, glide path means comprising selector means responsive to vertical departures of the airplane from said glide path, detector means responsive to changes in the angle of attack of the airplane, regulating means for varying the power output from the power unit of the airplane, means for controlling the operation of said regulating means in response to said selector means and said detector means whereby said airplane is maintained on said glide path, automatic pilot means for controlling the attitude of said airplane, dive control means as an element of said automatic pilot means, and means responsive to said detector means for actuating said dive control means at a predetermined critical angle of attack of said airplane whereby the attitude angle of said airplane is reduced.

20. In apparatus of the class described, in combination: a throttle; a control surface; a motor for said throttle; a motor for said control surface; a balanceable system including a member freely pivoted about an axis forward of its center of resistance for movement into alignment with the relative wind, means actuated thereby to be responsive to actual attack angle, and attack angle selecting means, said system being in balance when the actual attack angle is that selected; and means connected to said system and said motors and effective upon unbalance of said system to energize said motors for adjusting said throttle and said control surface to an extent determined by said unbalance.

21. In apparatus of the class described, in combination: means for causing an aircraft to move at a constant altitude; a member freely pivoted about an axis forward of its center of resistance for movement into alignment with the relative wind, so as to respond positionally to the attack angle of the craft; and motor actuated means connected to said first named means and said member and controlled by said member for maintaining a desired angle of attack while said altitude is maintained constant.

22. Apparatus of the class described comprising, in combination: a member freely pivoted about an axis forward of its center of resistance for movement into alignment with the relative wind; signal means connected to said member to give an output which varies with attack angle; power control means connected to said signal means for actuation in accordance therewith; stall prevention signal means connected to said first named signal means for adjustment in accordance with the signal therefrom; and elevator control means connected to said stall prevention signal means for actuation in accordance with the signal therefrom.

23. Attack angle control apparatus comprising, in combination: means responsive to actual attack angle including a member freely pivoted about an axis forward of its center of resistance for movement into alignment with the relative wind and a device connected to said member for adjustment in accordance with the position thereof to give a signal representative of the actual attack angle of the craft; means adjustable to give a signal representative of a selected value of attack angle; signal combining means interconnecting the above named means to give an output whenever the actual attack angle is not that selected; control surface servomotor means; and control means connected to said servomotor means and said signal combining means for controlling operation of said servomotor means in accordance with said output.

24. In control apparatus for an airborne craft having a propelling engine, in combination: means giving a first signal proportional to attack angle; means giving a second signal proportional to a variable factor affecting engine operation; means comparing said signals; and means adjusting the effective power of the engine whenever said signals are not in a desired relationship.

References Cited in the file of this patent
UNITED STATES PATENTS

| Number | Name | Date |
|---|---|---|
| 1,367,839 | Tarbox | Feb. 8, 1921 |
| 1,760,740 | Bramson | May 27, 1930 |
| 1,832,159 | Vanderlip | Nov. 17, 1931 |
| 2,191,250 | Fischel | Feb. 20, 1940 |
| 2,343,288 | Fink | Mar. 7, 1944 |
| 2,553,983 | Saxman, Jr. | May 22, 1951 |